United States Patent [19]

Florine

[11] Patent Number: 4,700,326

[45] Date of Patent: Oct. 13, 1987

[54] FIRMWARE TRANSITIONAL PROGRAMMABLE SEQUENTIAL LOGIC CONTROLLER

[75] Inventor: Jean Florine, Brussels, Belgium

[73] Assignee: Fabricom Corporation, Belgium

[21] Appl. No.: 616,588

[22] Filed: Jun. 4, 1984

[51] Int. Cl.⁴ ............................................. G05B 11/01
[52] U.S. Cl. ..................................... 364/200; 364/140
[58] Field of Search ............... 364/900 MS File, 140, 364/141, 200 MS File

[56] References Cited

U.S. PATENT DOCUMENTS

| | | | |
|---|---|---|---|
| 3,267,434 | 8/1966 | Clark et al. | 364/141 |
| 3,764,989 | 10/1973 | McClellan | 340/172.5 |
| 3,889,238 | 6/1975 | Sakurai | 340/172.5 |
| 3,942,158 | 3/1976 | Dummermuth | 340/172.5 |
| 4,162,536 | 7/1979 | Morley | |
| 4,518,872 | 5/1985 | Backes | 307/448 |

OTHER PUBLICATIONS

Comer, *Digital Logic and State Machine Design*, 1984, CBS College Publishing, New York.

*Primary Examiner*—Archie E. Williams, Jr.
*Assistant Examiner*—Michael J. Ure

[57] ABSTRACT

An apparatus for controlling external devices in a controlled installation following a control sequence includes a scanning pulse generator arranged to generate scanning pulses at regularly offset times, and an input detection circuit comprising transition detectors each of which detectors is adapted to accept a distinct input variable signal associated with an external device or system component and a respective one of said scanning pulses to detect a transition or change of state of the input variable signal. An address signal is produced substantially immediately for accessing a sequential memory in response to the presence of a respective one of said scanning pulses and an input transition. The sequential memory stores data identifying the stages in the control sequence wherein the different storage locations are designated by a respective address defined by the particular input channel and a given stage. The sequential memory is arranged to accept the address signals from the transition detectors at the time an input transition occurs to provide the new stage data in response to each such transition and corresponding address signal. An output function memory stores the command signals for the external devices under control of the apparatus and responds to the new stage data from the sequential memory and level or alarm signals from the controlled installation to provide the associated command signal.

6 Claims, 5 Drawing Figures

| STAGE | CHANNEL ADDRESS (LSB) | | | | | |
|---|---|---|---|---|---|---|
| | (000001) $e_1$ | $e_2$ | $e_3$ | $e_4$ | (000101) $e_5$ | ----- |
| 0 | STAGE 1 (0000001) | | | | | |
| 1 | | | | | STAGE 7 (0000111) | |
| 2 | | | | | | |
| ⋮ | | | | | | |
| 7 | | | | | | |

STAGE ADDRESS (MSB)

FIRMWARE TRANSITIONAL PROGRAMMABLE SEQUENTIAL LOGIC CONTROLLER

BACKGROUND OF THE INVENTION

The present invention relates to a programmable logic controller for the sequential control of various devices and apparatus and deals more specifically with a firmware transitional programmable sequential logic controller.

A typical programmable logic controller (PLC) essentially comprises input and output modules, a memory and a processing unit (logic circuitry or microprocessor). The input modules accept signals from the external devices in an installation under control (e.g. switches, thermocouples, valves ..). These input signals are measurements of physical magnitudes such as pressure, flow rate, temperature and so on, which are then converted into usable information in analog or digital form. The processing unit drives every function of the controller; it directs the scanning of input signals, evaluates these relative to the information stored in the memory and then triggers output signals to the output modules which control the external devices. The memory associated with the PLC stores the control plan in the form of a program or instruction set and generally includes all information relating to how the input and output data should be processed. A programming device is used with the PLC to load the program into the memory, usually by means of a programming language. The programming device can range in sophistication from a simple manual programmer to a full fledged CRT terminal.

The operation of known PLC's are based on the detection of a combination of values of input variables and use software stored in memories to produce the necessary command signals to control the external devices in accordance with the given combinations of input variables. In spite of all their advantages as against the microcomputers and the hard-wired logic controllers, the known PLC's are perceived by users as presenting certain handicaps which still constitute obstacles to a wider adoption. To quote the main ones:

1. In the design phase, the software development effort takes on a disproportionate importance which makes a direct dialogue between the system engineer and the machine difficult. The controller is not transparent enough for the system engineer who is not a computer scientist. As a matter of fact, ladder diagrams and other similar methods do make controllers user-friendly, but this takes place only after the main design work has been accomplished. Therefore, a need arises for a simple and universal programming method capable of accommodating sequential as well as combinational controls.

2. The relative slowness of the known PLC's (an average of 50 milliseconds between two consecutive input scannings) does not enable them to compete with hard-wired logic apparatus (having an average of less than 200 nanoseconds between two consecutive input scannings) in some sequential control applications where speed is essential such as, for example, in electric power distribution monitoring or other real time applications.

3. It is generally not possible to take into account all significant events that may influence the evolutions of the sequences in a controlled system. This limitation practically bars the known PLC's from environments where a strict quality assurance is required (e.g., some applications in nuclear engineering) for the known PLC's cannot prevent the controlled system from being threatened with unforeseeable and potentially dangerous evolutions.

The object of this invention is to provide a firmware transitional logic controller which overcomes the drawbacks and limitations of the known programmable logic controllers. A further object of the invention is to provide a firmware transitional logic controller which is especially designed for sequential control and which furthermore allows for parallel operations, i.e. simultaneous processing of various tasks by different units in a coordinated fashion, with or without hierarchy.

SUMMARY OF THE INVENTION

The above problem is solved in accordance with the present invention by a firmware transitional programmable sequential logic controller (PSLC) for use with the sequential control of a number of operation variables associated with external devices in a technical installation and following a control sequence including successive stages wherein each stage uniquely defines a known combination of operation variables each of which variables is associated with the state of the associated external device in the installation. The state of the external devices and system components comprising a controlled installation is represented by a distinct input variable signal which is coupled to the controllers. All of the next possible stages from a given stage in the control sequence are mutually exclusive and the actual next stage is determined by the current stage and a transition in one of the input signals. The controller comprises scanning pulse generator means arranged to produce scanning pulses at regularly offset times, the time of each pulse corresponding to a particular input variable signal. An input detection circuit is provided and comprises a plurality of transition detectors, each of the detectors being coupled to a different input variable signal on an input channel and arranged to detect the transition of a distinct input variable signal in response to the occurrence of a respective one of the scanning pulses and a transition means are provided to produce an address signal when at least one input transition occurs during the scanning cycle. A sequential memory means has a number of accessible storage locations and stores data identifying the stages in the control sequence. The different storage locations are designated by a respective address defined by at least one input variable signal transition. The sequential memory means is arranged to accept the address signals from the transition detectors at the time a transition occurs in an input variable signal to provide the new stage data in response to each such transition and corresponding address signal. An output function memory means is provided for storing output function data defining the commands for the devices under control and is arranged to accept the new stage data from the sequential memory to provide a corresponding command signal associated with the new stage to control the operation of the corresponding external devices.

In an exemplary embodiment, the scanning pulse generator means comprises a binary counter advancing in response to clock signals to provide successive binary data signals each signal of which identifies an input channel having a different external device associated with it. A multiplexer is arranged to convert the output data signals from the binary counter into successive scanning pulses for the transition detectors. Signals from the transition detectors are then applied as enable signals to a stage change command gate arranged to accept the binary data signals from the counter and a transition detector to produce the address signals for the sequential memory.

The major advantage of the firmware transitional programmable sequential logic controller of the invention is that it does not use a processor and software but rather uses firmware which produces an operating speed one thousand times higher than that of classical programmable controllers (in the order of a microsecond instead of a millisecond scan time). Thus, the present invention combines the features of programming flexibility of software with the operating speed of hardwired logic apparatus.

Further the elimination of any software allows the development and programming to become transparent for the system engineer with the result that the usual programmer in charge of translating the system engineer's conceptual design into software routines is made unnecessary. Too often the programmer does not know the physical system as well as the system engineer and usually adds safeguards and other programming tricks that complicate and obscure the system operation. The system operation is also often masked by the formalism of the software which departing from its essential function of being a means has an irresistible tendency to become an end in itself. By contrast, the firmware transitional programmable controller of the invention insures a greater reprogramming flexibility. In particular, it is possible to add input variables, stages and transitions to the process without having to modify the preexisting structure.

Also, the transitional programmable controller of the invention makes it possible to take into account all input events that may affect the system's behavior (provided the system engineer does imagine those events) which is particularly important where an unpredictable evolution cannot be tolerated, for instance in nuclear engineering applications.

Finally, the structure of the firmware transitional programmable sequential logic controller (PSLC) of the invention is substantially less complex than known PLC's so that a separate controller can be associated with each parallel evolution trajectory. The system of parallel evolutions associated with the transitional PSLC permits implementation of actual real-time parallel evolutions between rapid and easily programmable controllers or microcomputers and thereby, the approach to the automated factory is fundamentally modified through an enhanced control of flexible manufacturing systems.

The distinct advantages of the transitional PSLC according to the invention opens new application fields and therefore new markets to which classical controllers did not have access given their limitations. The PSLC also brings a new perspective and a greatly improved efficiency to existing applications. The main application fields include e.g. manufacturing automation, security and access control, the electric power industry and in fact the whole spectrum of information industries. In particular, it is felt that the firmware transitional PSLC allows for a breakthrough in the control of flexible manufacturing systems (FMS) and that it may help achieve considerable progress in the quest for more efficient (i.e. non von-Neumann) computer architectures.

BRIEF DESCRIPTION OF THE DRAWINGS

FIG. 5 is an exemplary memory configuration associated with the stage change diagram of FIG. 4.

DESCRIPTION OF AN EXEMPLARY EMBODIMENT

The controller according to this invention is intended to be used to control a plurality of operation variables of external devices following a control sequence having a number of successive stages, each stage defining a known combination of operational variables associated with the external devices in a controlled installation. Each stage further takes into account the prior history of the control sequence to direct the future evolution of the controlled installation by moving the control sequence from a current stage to a next possible stage by detecting a transition in a given input signal. The different stages in the control sequence are stored at distinct locations in a sequential memory 10. The memory 10 is a programmable store which can be of the EPROM or RAM type for instance. In the controller of the invention each sequence stage stored in the sequential memory 10 is designated by a binary address.

The controller is arranged to accept a number N of input signals received from the installation under control and each input signal is associated with a particular operation variable (physical parameter) in the controlled installation. Referring to the block diagram of FIG. 1, the input signals for example, from the external devices under control or other system components in the controlled installation, are accepted on bus 100 as distinct input channels $e_1 \ldots e_N$ coupled to an input detection circuit 1. The input detection circuit functions to detect transition, if one is present, of an input signal associated with an input channel in response to successive scanning pulses which are produced by various appropriate means such as a selector driven by a clock or a binary scanning device driven by a clock. As stated hereinbefore, the speed of operation of the controller of the present invention is on the order of 1 microsecond per input channel, that is, a transition occurring on an input channel can be detected at a frequency or rate of one every microsecond. Since a different input channel is scanned in response to successive scanning pulses and one channel is scanned every microsecond, the clock rate must have a frequency or rate equal to one megahertz (MHz).

Figure 1:
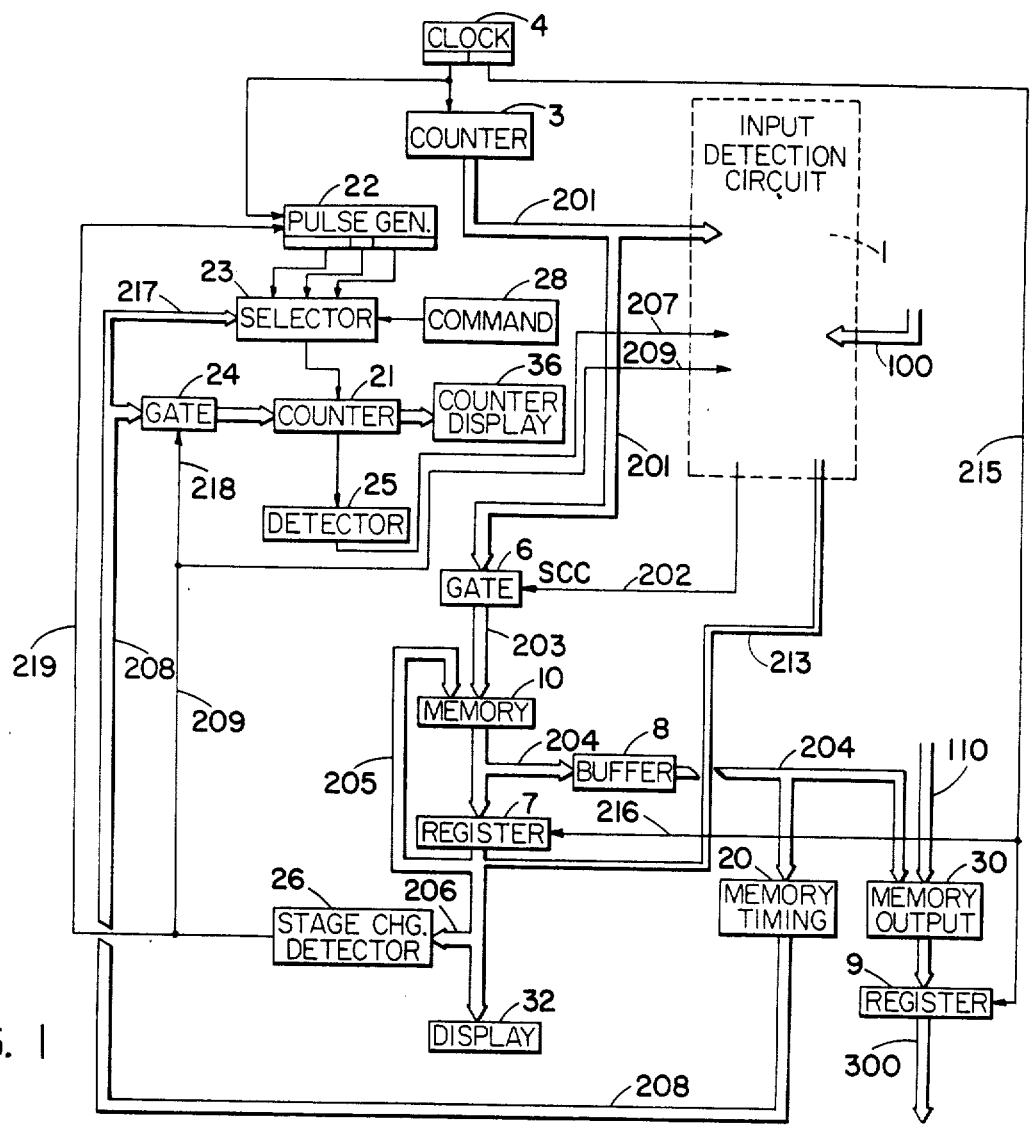
FIG. 1 is a functional block diagram of an exemplary embodiment of the invention.
Figure 2:
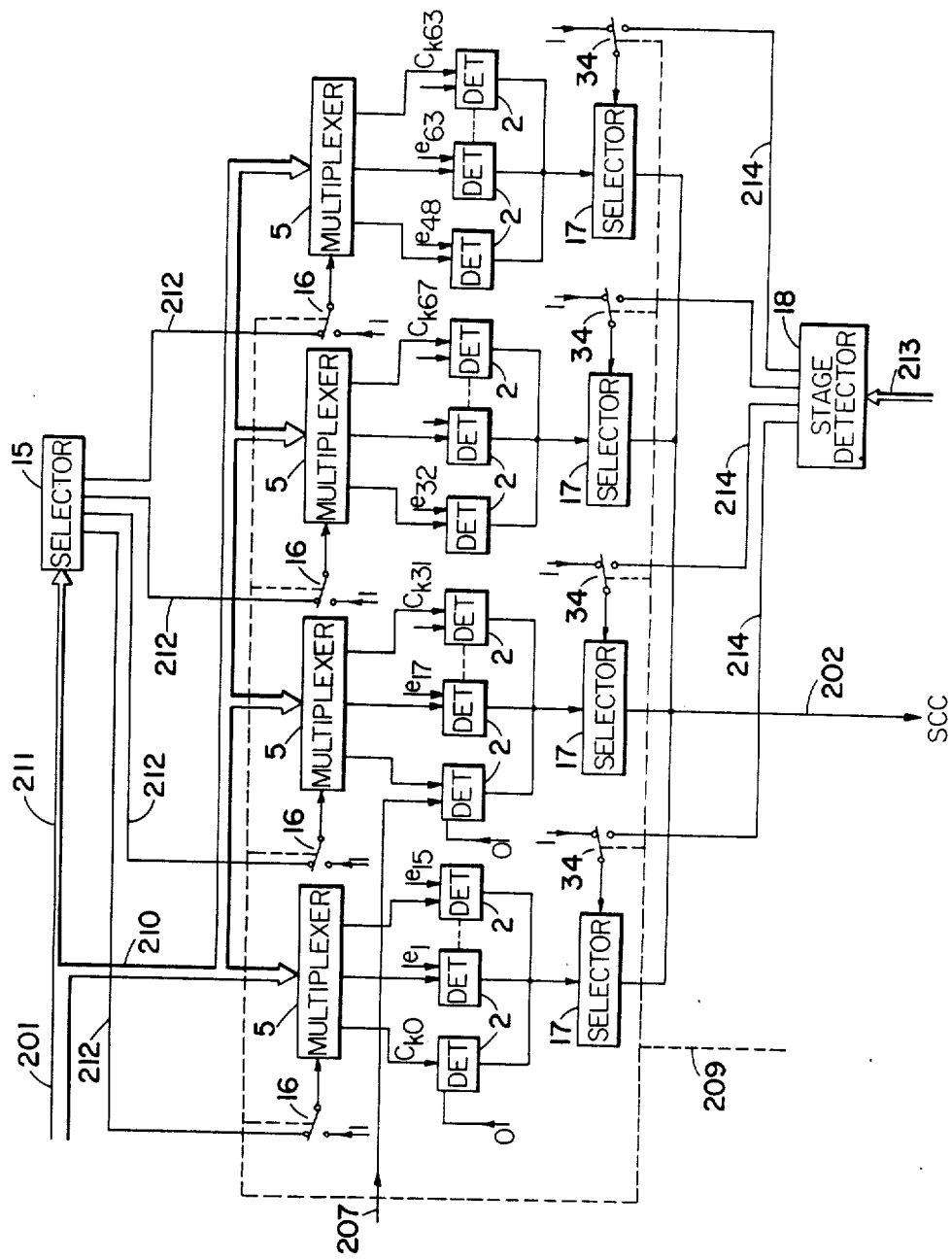
FIG. 2 is a schematic diagram of an embodiment for the input detection circuit shown in FIG. 1.

In the exemplary embodiment shown in the drawings such a binary scanning device comprises a binary counter 3 driven by a clock 4 shown in FIG. 1 and multiplexer means 5 shown in FIG. 2 wherein FIG. 2 illustrates a schematic diagram of an illustrative embodiment of the input detection circuit 1. The output count of the binary counter 3 is advanced by the clock pulses and at each clock pulse the counter's binary content is incremented so as to identify successively in accordance with the value of the binary count a distinct input channel. The binary value from the counter 3 is outputted to the bus 201 which in turn is coupled to bus 210. The bus 210 is coupled to the input of the multiplexers 5. The multiplexers 5 produce the successive scanning pulses $Ck_i$ as explained below.

In the illustrative embodiment shown in FIG. 2, the input detection circuit 1 comprises sixty-four transition detectors 2 and the detectors are subdivided into four groups of sixteen. Each detector 2, except the detectors numbered 0 and 16 which are used for special purposes, has an input connected to a distinct input channel $e_i$. A second input of each detector 2 is connected to accept a respective scanning pulse $Ck_i$. The scanning pulses for the detectors 2 of each detector group (4 groups in the illustrative embodiment) are produced at the outputs one at a time by a one-in-sixteen multiplexer 5 based on the binary data in the bus 201 as derived through the bus 210. The selection of the proper scanning multiplexer 5 will be left out of consideration for the time being, but is described later herein.

The binary contents at the output of the scanning counter 3 at each clock pulse identifies a distinct input channel and in response to this binary data each multiplexer 5 produces a binary "1" at each of its outputs one at a time successively whereby a scanning pulse $Ck_i$ is applied successively to the scan input of each detector. In response to each scanning pulse $Ck_i$, a respective detector 2 reads a distinct input channel $e_i$ to detect whether or not a transition has occurred thereon. Detectors 0 and 16 are not connected to an input channel but are instead conditioned to perform special functions when the timing circuits of the controller are implemented with discrete circuit components as contrasted to implementation with integrated circuitry wherein all timing functions are coordinated internally within the chip circuitry. In any event, when non-integrated circuit components are utilized, it may be necessary to refresh the memory of a feed-back register 7, which register 7 is explained hereinafter, in cases where no input transitions occur during a scan cycle, so that the current stage information is retained when the controlled system is stable. The feed-back register 7 is refreshed, in the absence of an input signal transition, during the time scanning pulse $CK_o$ is applied. When a scanning pulse $Ck_{16}$ is applied to detector 16, the detector 16 is conditioned to detect a transition on lead 207 coupled to the timing circuit to indicate that a given time interval associated with a given stage has elapsed and that the controller is ready for the next stage as described hereinbelow. It will be readily understood by those skilled in the art that detectors 0 and 16 may be used with distinct input channels when implementation is done with integrated circuitry.

Figure 3:
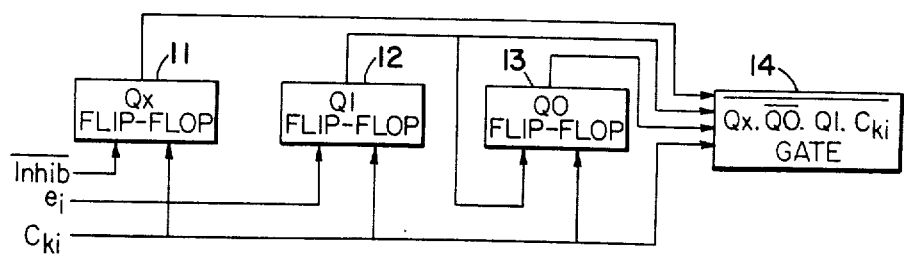
FIG. 3 is a schematic diagram of an exemplary circuit which may be used as a transition detector.

Each transition detector is for instance comprised of two-bit shift registers or flip-flops 12, 13 connected with a detection gate 14 as shown in FIG. 3. The flip-flop 11 will be left out of consideration at this stage of the description. The flip-flop 12 has an input connected to an input channel $e_i$ and another input connected to accept an associated scanning pulse $Ck_i$. The flip-flop 13 has an input connected to the output $Q_1$ of flip-flop 12 and another input connected to accept the scanning pulse $Ck_i$. The output $Q_0$ of flip-flop 13 together with the output $Q_1$ of flip-flop 12 and the scanning pulse $Ck_i$ are applied to the inputs of a detection gate 14. Upon occurrence of each scanning pulse for an associated input channel $e_i$, the shift register senses the input value of $e_i$, that is, the voltage potential on the channel input lead.

When $e_i$ is "0", the outputs $Q_0$ and $Q_1$ are "0". As soon as $e_i$ is "1", a logical "high", a first scanning pulse gives the value $Q_1Q_0$ ="10" and after a second scanning pulse associated with the input channel $e_i$, the output value is $Q_1Q_0$="11". The contents of the register is "11" until a new transition of the input $e_i$ occurs. The output of gate 14 is "1", a logical "high", only when the value of the scanning pulse $Ck_i = 1$, i.e. during one cycle of the clock signal. The flip-flop 11 is connected to accept an external binary level signal INHIB and its output $Q_x$ is connected to the gate 14 such that the detection of the input channel $e_i$ can be inhibited in response to the signal INHIB.

Each of the scanning pulses $Ck_i$ thus periodically enables an input channel $e_i$ to be sensed and the corresponding transition detector 2 determines whether or not the input signal associated with the input channel $e_i$ has changed value during the interval between the immediately previously applied scanning pulse and the currently applied scanning pulse. In this manner, two transitions that seem to occur simultaneously are separated and detected successively in the order in which the input channels are scanned. A missed detection of a transition is automatically captured during the following clock cycle.

The outputs from the transition detectors 2 are logically added or connected at a node in a way well known to those skilled in the art such that the output of one transition detector does not influence the output of another transition detector. The output of a detector 2 becomes a "1" or a logical "high" as soon as a transition is detected on an input channel associated with the detector and a stage change command signal, SCC, appears as a "1" or logical "high" on the stage change command line 202 and remains on the line 202 until the end of a full cycle of the clock signal. At the time a transition is detected, the command signal SCC on line 202 drives the control input of a stage change command gate 6 (FIG. 1) indicating that some change has been detected by the system. In response to the SCC signal, the gate 6 then couples the binary data on bus 201 to the bus 203. The value of the binary data on bus 203 identifies the input channel which is associated with a signal transition and is used to address the sequential memory 10 so that the new stage data stored at the addressed location in the memory is read onto the bus 204.

The data on bus 204 is transferred into a feed-back register 7 in response to a clock pulse received from the clock 4 through lines 215 and 216. In response to the next clock pulse, the register 7 transfers the data representative of the new stage on the bus 205 which reads them into some bit positions of the input to memory 10. In this manner, the sequential memory 10 at any time provides new stage data which identifies the next stage to be in, that is, the new stage data on bus 204 now becomes the current stage data on bus 205 and it is this current stage data on bus 205 that is inputted to the memory 10.

Figure 4:
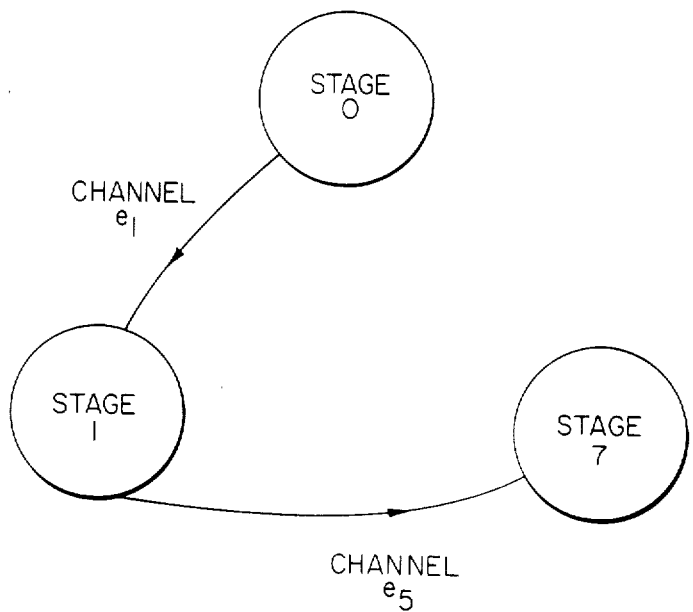
FIG. 4 is a schematic diagram of an exemplary stage change diagram.

As an example and referring to FIGS. 4 and 5, it is assumed the system is initially in stage 0 and that the occurrence of a transition on an input channel $e_i$ corresponding to an input channel where i = 1 has to shift the system into stage 1 and further that a transition occurring on the input channel $e_5$ has to shift the system into stage 7.

When the system is in stage O, the six least significant bits (LSB) in bus 203 are 000000 and the system is stable. The input channels, as described in the foregoing, are scanned successively in succeeding cycles as the scanning counter 3 is advanced in response to the clock pulses. At each count of the scanning counter, the data in bus 201 is incremented by 1. When a transition is detected on the input channel $e_1$, the value of the binary data in bus 203 takes the value 1 and the address in bus 203 is thereby 000001. Using well known addressing techniques, the appropriate location in the sequential memory is accessed, in this case, the column corresponding to input channel $e_1$ and stage 0, since it is assumed the starting point is stage 0. This location in memory in the example contains the stage data representative of the stage the system will be in because of the detection of a transition on channel $e_1$ when the system was in stage 0.

Upon occurrence of the next clock pulse, the new stage address at the channel $e_1$, stage O location and represented in the example as 7 bits of data is outputted from the sequential memory 10 onto bus 204 and transferred into the most significant bit positions (MSB) of the memory input through bus 205 while the six LSB's appearing on bus 203 are reset to the 000000 value since the system is again stable and in readiness to detect the next transition. The new stage data, that is, data identifying stage 1, is also coupled from the sequential memory through a buffer 8 to a timing memory 20 and an output function memory 30 as explained hereinbelow.

The system is now in stage 1 in the example and when a transition is detected on the input channel $e_5$, the binary data on the bus 203 has a value of 5 and the six LSB's are 000101. The location in memory corresponding to channel $e_5$ and stage 1 is accessed and this location contains the new stage data, that is, stage 7. The new stage address is then transferred into the seven MSB's of the memory through bus 205 upon the occurrence of the next clock pulse and the six LSB's appearing on bus 203 are reset. The new stage data, that is, data identifying stage 7, from the sequential memory 10 is also coupled to the timing and output function memories. The system is now in stage 7 which includes the history of the controlled system to this point, that is, a transition on input channels $e_5$ and $e_1$. The system is stable again in readiness to detect the next transition. And so on.

Several important features of the controller of the present invention become readily apparent from the foregoing example. One such feature is the flexibility of the memory addressing allows additional stages and input channels to be added to the system in a linear fashion since each additional input or stage only adds a column or row to the memory because only a transition associated with the input variable signal is detected. This is in contrast to known PLC's where an additional input requires a doubling of the memory capacity to store the additional possible combinations due to the added input. Another feature that becomes obvious is that the number of bits used to identify an input channel or stage need only be as large as necessary to identify the number of memory locations required for the size of the system. An additional feature of the controller of the invention is that a microprocessor and the associated interrupt and operational times necessary to examine all inputs is not required, thus the controller of the present invention reacts substantially immediately to a change in an input channel.

As pointed out earlier herein, the transition detectors 2 in the detector groups (there are four groups in the illustrated embodiment) are enabled successively through the multiplexers 5 so as to cyclically scan each input channel successively. The proper multiplexer 5 associated with a group of input channels is selected by a group select signal produced by a selector 15 in response to a channel identification code present on the bus 211 connected to some bit lines of bus 201. The group select signal enables the proper multiplexer 5 through line 212 and a switch 16 responding to a selection command signal from line 209. The common output line from each detector group is connected to the stage change command line 202 through a further selector 17. The selector 17 is actuated in response to a stage group select signal applied on line 214 by a stage group detector 18. The stage group detector 18 input is coupled to bus 213 and is responsive to a stage change signal received on the bus 213 from the feed-back register 7 shown in FIG. 1. The transition detectors 2 in the groups thereby cyclically scan the input channels $e_i$ and the associated channel detector 2 in the selected group senses whether or not an input transition has occurred on the corresponding input channel. Obviously, the detectors can be arranged in one group assuming the multiplexer 5 has a sufficient number of output leads in which case the selector means are omitted.

The stage address data carried on bus 204 is inputted to a timing memory 20, such as an EPROM, coupled to the bus 204. The timing memory 20 stores data representative of the time associated with each stage of the control sequence, that is, the time interval that a stage remains in before changing to another stage in the absence of input signal transitions. In response to the stage address data carried on the bus 204, the time interval data associated with a given stage is accessed from the timing memory 20 and outputted to a timing bus 208. The time interval data carried on the timing bus 208 is inputted to a timing control circuit or timer coupled to the timing bus 208. The timing control circuit comprises a count down counter 21, a clock pulse generator 22 coupled to the counter 21 to produce clock pulses to drive the counter 21, and a clock 4 coupled to the clock pulse generator 22. The rate or frequency of the time pulses required to produce a timing scale interval in units of milliseconds, seconds and minutes is selectable by a selector 23. The selector 23 is coupled to a command device 28 which responds to a bit signal in the time interval data carried on timing bus 208. The bit signal is coupled to the selector 23 via a bus 217 which bus 217 carries a segment of the time interval data appearing on the timing bus 208 to cause the selector 23 to select the proper timing interval unit.

The time interval data is read from the timing memory 20 into the count down counter 21 through a gate 24 coupled between the counter and the timing bus 208. The counter 21 is loaded with a starting count equivalent to the given time interval data and starts to count down from the starting count value. When the counter 21 counts the equivalent number of counts, that is, when the counter 21 counts down to zero, the given time interval has elapsed. At the end of the count an end-of-timing detector 25 coupled to the counter 21 is activated and provides a signal to indicate an input transition. The input transition signal is coupled from the output of the detector 25 to an input channel of the input detection circuit 1 via a line 207 for detection when an input transition occurs on that channel.

A change of stage is detected by a stage change detector 26 and when such a change occurs the count down counter 21 and the clock pulse generator 22 are reset to zero (indicating the timing interval is completed) in response to a signal generated by the stage change detector 26 coupled to the counter 21 and generator 22 by leads 218 and 219, respectively.

The block labelled 32 represents a display device arranged for displaying the contents of the feed-back register 7 to indicate the identity of the current stage. The block labelled 36 represents a display device arranged to display the contents of the count down counter 21 to indicate time interval information associated with a given stage in the controlled sequence. The display devices and their generation are well known to those skilled in the art.

The new stage data on bus 204 is also inputted to the output function memory 30 through a buffer 8. The output function memory 30 stores the output function values and in response to each new stage address data on bus 204 an associated output function value appears at the outputs of the memory 30. The output function is inputted to a synchronization register 9 coupled to the memory 30 in response to a clock pulse received on line 215 in such a way that an output value change is synchronized with a stage change. The register 9 outputs the command signals on the output bus 300 coupled between the register 9 outputs and the external devices under control. The output function memory 30 is also arranged to accept signals on bus 110 directly, such as level or alarm signals from the installation under control coupled to bus 110, so that the level or alarm signals can modify the output command signals as defined by the memory 30 to control the external devices.

The firmware transitional sequential logic controller of the present invention has a number of advantages in terms of operating speed, flexibility, predictability and mastery of real-time parallel evolutions, as reported hereinbefore.

In contrast with the known PLC's that have an operating speed in the order of a millisecond, the transitional controller of the invention has an operating speed in the order of a microsecond thus making it possible to process many more decisions in the time interval between the detection of an input transition and the actual trigger of an output command signal. Further, the controller of the invention combines the high operating speed of hard-wired logic controllers with the programming flexibility of software logic, thereby allowing a greater reprogramming flexibility by the system engineer.

It should be noted that generally the staggering number of all possible input states of a system prevents an exhaustive description in classical controllers utilizing microprocessors or computers wherein a limited number of combinations of input variables can be anticipated. In contrast, the controller of the present invention permits the behavior of the control to be specified for all input events including independent and non-simultaneous transitions that may affect the controlled system's behavior. This predictability feature is particularly important where an unpredictable evolution cannot be tolerated, for instance in the nuclear engineering field. This predictability feature permits the controller of the invention to be used as an ordered sequence detector in security access control applications wherein a function command signal should be produced only when an ordered sequence of actions are performed, e.g. the control of the opening of a door by means of a digital keyboard. In addition to this illustrated security application, an ordered sequence detector can be used as an auxiliary controller to trigger the excitation of a main controller. The excitation is then caused no longer by the transition of just one input variable but by an ordered sequence of such transitions. Therefore, a transitional PSLC according to the invention allows for the design of much more complex logic control systems than previously possible.

The advantages of the transitional PSLC of this invention, as reported hereinbefore, open new application fields such as security and access control, and enhance existing ones, such as manufacturing automation.

In the context of manufacturing automation, one of the fundamental issues is the need for effectively coordinating the various machines at the lowest possible cost. The controller of the invention, due to its parallel evolution capability, allows for a novel approach to the problem that is, the use of several programmable controllers, each controlling a distinct machine, and working in a parallel mode by transmitting messages to each other with a view to coordinating their respective operations. This approach is made possible by the high speed of the transitional PSLC of the invention and results in an enhanced control of flexible manufacturing systems.

The great programming and reprogramming flexibility of the transitional PSLC according to the invention also allows it to be used in security and access control applications wherein the controller authorizes access to a premise by opening a door or a safe only when a desired sequence of actions take place while any first event not belonging to the desired sequence immediately provokes an alarm. This type of application is impossible to manage with the desired flexibility using classical controllers which cannot take into account all the possible not-allowed evolutions and binary combinations even for a small number of input combinations.

Finally, the parallel evolution capability of the transitional PSLC of the invention permits it to achieve a significant progress in parallel data processing wherein the tasks are distributed between several local processors with a constant exchange of information therebetween for supervision or coordination purposes. The transitional sequential controller used as an interruption controller is capable of monitoring and managing the exchange of information between decentralized microcomputers since it behaves as a rapid logic unit that enforces priorities in controlling the interruptions of these microcomputers.

Obviously, the transitional PSLC of this invention can be implemented in various embodiments by a person having ordinary skill in the art. Furthermore, while in the foregoing the only concern has been to describe the novel logic arrangement for performing the logic decisions, it should be understood that a transitional PSLC in accordance with the invention can be realized with or arranged for being coupled with suitable processor means for performing arithmetic and computing functions.

What is claimed is:

1. A transitional programmable sequential logic controller for the sequential control of a number of operation variables associated with external devices in a controlled installation and following a control sequence having a number of successive stages wherein each stage uniquely defines a known combination of operational variables associated with the external devices in the controlled installation wherein the next possible stages from a given stage in the control sequence are mutually exclusive and the actual next stage is determined by the current stage and a transition signal associated with at least one of the external devices and system components comprising the controlled installation, said controller comprising:

scanning pulse generator means arranged to generate N scanning pulses at regularly offset times; input detection circuit means comprising N input signal transition detector means, each of said transition detector means being adapted to accept a distinct input variable signal associated with one of an external device and system component as well as a respective one of said scanning pulses to detect a transition in said input variable signal occurring substantially simultaneously with a respective one of said N scanning pulses; means for producing a stage address signal corresponding to the detection of a transition in an input variable signal when at least one input transition occurs during the scanning cycle, said stage address signal being generated immediately upon the occurrence and detection of a transition associated with an input signal; sequential memory means having a number of storage locations for storing data identifying each of the stages in the control sequence, each of the different storage locations being identified and addressable by a respective address defined by at least one input variable signal transition, said sequential memory means being adapted to accept said address signals from the N transition detectors and for providing identification data representative of a new stage in response to each address signal, and output function memory means for storing output function data defining the commands for the external devices under control, said output function memory means coupled to the sequential memory means and being adapted to accept the next stage identification data from the sequential memory means and for providing a corresponding set of command signals to control the operation of the corresponding external devices.

2. A transitional logic controller according to claim 1, wherein the scanning pulse generator means comprises a binary counter driven by clock signals to produce successive data signals each of which signals identifies a corresponding input variable signal; multiplexer means for converting the data signals from said binary counter into successive pulses for the transition detectors, and said input detection circuit means further comprising stage change command gate means for responding to the signals from said transition detectors and for accepting the data signals from said binary counter to produce a corresponding address signal for the sequential memory means.

3. A transitional logic controller according to claim 2, wherein the transition detectors are subdivided into several groups in parallel arrangement, each of said groups being connected sequentially one at a time through selector means to sense sequentially each of said input variable signals for the occurrence of a transition in any of said input signals.

4. A transitional logic controller according to claim 1, wherein said transition detector comprises a two-bit shift register having a first input connected to an associated input channel, a second input connected to accept a respective scanning pulse associated with the input channel and a third input connected to accept an external binary level signal to inhibit the detection of a transition of an input signal associated with a said channel, and a logic gate connected to said shift register for logically combining the outputs of the shift register and the associated channel scanning pulse to activate said stage change command gate means upon the detection of an input signal transition.

5. A transitional controller according to claim 2, further comprising timing interval memory means for storing a plurality of a number of counts, each of said plurality corresponding to the timing interval data associated with and corresponding to the occurrence of a transition in an input channel signal comprising each stage in the control sequence, said timing interval memory means being addressed by the output data from the sequential memory means to access the corresponding timing interval data associated with an input channel; timing interval control circuit means comprising generator means for producing a number of timing clock signals; stage change detector means for producing a stage change input transition signal corresponding to the occurrence of a change of stage to load said generator means with a value of said number of timing clock signals, and counting means for counting a predetermined number of timing clock signals in response to said stage change input transition signal and the timing interval data accessed from the timing interval memory means for producing an end-of-timing interval signal to drive the controller into a new stage identified by an associated stage address in the sequential memory means.

6. A transitional logic controller according to claim 1, wherein the output function memory means includes means for accepting signals directly from the external devices and for modifying an output command signal with other output command signals stored in the output function memory means to control the external devices in accordance with a predetermined control sequence stored in the output function memory means.

* * * * *